US006206300B1

(12) United States Patent
Roudebush et al.

(10) Patent No.: US 6,206,300 B1
(45) Date of Patent: Mar. 27, 2001

(54) AEROSOL GENERATOR

(75) Inventors: Dennis A. Roudebush, Noblesville; Conrad D. McGinnis, Carmel; Sergio Rey-Villamizar, Fishers, all of IN (US)

(73) Assignee: Curtis Dyna-Fog, Lyd., Westfield, IN (US)

(*) Notice: Subject to any disclaimer, the term of this patent is extended or adjusted under 35 U.S.C. 154(b) by 0 days.

(21) Appl. No.: 09/364,034

(22) Filed: Jul. 30, 1999

(51) Int. Cl.[7] ................................. B05B 9/03; B05B 1/14
(52) U.S. Cl. ............................ 239/77; 239/164; 239/170; 239/176
(58) Field of Search ............................. 239/77, 159, 160, 239/164, 170, 176

(56) References Cited

U.S. PATENT DOCUMENTS

| | | | |
|---|---|---|---|
| 2,738,226 | * | 3/1956 | Bals ........................................ 239/77 |
| 2,978,185 | * | 4/1961 | Pearch ................................... 239/77 |
| 4,116,385 | * | 9/1978 | Waldron ................................. 239/77 |
| 4,182,491 | * | 1/1980 | Parke et al. ........................ 239/77 X |
| 5,248,448 | * | 9/1993 | Waldron et al. .................... 239/77 X |
| 5,269,461 | | 12/1993 | Davis . |
| 5,439,173 | | 8/1995 | Waldrop . |

OTHER PUBLICATIONS

Curtis Dyna–Fog Ltd., Westfield IN 46074, Operation, Maintenance and Spare Parts Manual, Dyna–Fog MAX-IPR04 Model 2742 Series 4 ULV Aerosol Applicator.

* cited by examiner

Primary Examiner—Lesley D. Morris
(74) Attorney, Agent, or Firm—John H. Stowe (57) ABSTRACT

This invention provides a mobile aerosol generator which enables the vehicle operator to remotely reposition the droplet launch trajectory during normal operation of the generator and the vehicle. Azimuth and elevation launch directions are controlled separately or simultaneously by the vehicle operator using a remote control box. The repositioning ranges are about 180 degrees in azimuth included angle centered about a preset position, normally the direction of vehicle travel, and from about 60 degrees above to about 15 degrees below the plane of vehicle travel. A turntable like actuator provides azimuth repositioning and a linear actuator coupled to the nozzle provides elevation repositioning. Tubular nozzle support structure also acts as conduit for pressurized air to a two-fluid nozzle. A liquid delivery system provides a controlled amount of liquid to the nozzle where the fluid is sheared into droplets using pressurized air.

18 Claims, 12 Drawing Sheets

AEROSOL GENERATOR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX."

Not Applicable

BACKGROUND OF THE INVENTION

1. Field of the Invention

This invention relates to apparatus for generation and distribution of chemical aerosols and more particularly to apparatus used to generate and distribute such aerosols from moving vehicles.

2. Background Information

Aerosol spraying done on a large scale is performed using a sprayer mounted in the rear of a truck or utility vehicle. Spray nozzles shear a liquid chemical formulation into effective sized droplets having a mass median diameter of 5–20 microns and release these droplets into the atmosphere. Typical chemical formulations include pesticides, odor control agents, bird repellents and the like. Although the natural wind currents greatly influence travel of the spray droplets to the target, a second nozzle function is to launch the droplets in the right direction. Therefore, it is desirable to be able to move the spray nozzle head to advantageous position which takes into account the natural drift of the droplets and the adjacent topography. Prior art sprayers have long included means for adjusting the angle of output of the nozzle but such adjustments are manually made using tools and are impractical during the course of operation of the sprayer. For example, consider the situation of spraying on both sides of a one-way street. First, the street is traveled with the nozzle pointing in the direction of one side of the street. Then in order to spray the other side of the street a safe position must be found to stop the vehicle and manually adjust the nozzle direction before spraying the other side of the street. Also, when spraying along a roadway which runs along the circumference of a hillside, it is desirable to spray generally downwardly in one direction and generally upwardly in the other direction.

There is a need for an aerosol generator where the direction of droplet launch can be readily controlled by the operator of the vehicle while the machine is in normal operation and the vehicle is in motion.

A well known way of generating aerosols is with a two fluid nozzle with a first fluid generally being air at elevated pressure and the second fluid being the formulation liquid from which the aerosol is made. Two-fluid nozzles utilize the energy contained in the first fluid to convert the second fluid into an aerosol. Generally, this is done by swirling the first fluid in a cyclonic manner around a sharp edge. The second fluid, generally a liquid, is injected at the sharp edge in a controlled manner. The resulting shearing action produces droplets whose mass median diameter generally increase with increasing viscosity of the second fluid and decrease with increasing energy levels of the first fluid. An example of a prior art aerosol generator is Model Maxi Pro 4 by Curtis Dyna-Fog, Ltd., Westfield Indiana and is documented in an Operation, Maintenance and Spare Parts Manual dated November 1998.

BRIEF SUMMARY OF THE INVENTION

The present invention is an aerosol generator for dispensing droplets in the 5–20 micron range using a two-fluid nozzle. The aerosol generator of the present invention includes an engine and blower for producing a supply of air at elevated pressure, a metered fluid supply for communicating a liquid to a two fluid nozzle where an aerosol is generated and droplets are launched into the atmosphere. Preferably, a plurality of nozzles is used to increase generator output capacity. A distinguishing feature between prior art generators and the generator of the present invention is the present invention includes capability for the operator of the transporting vehicle to reposition the nozzle in azimuth and elevation while the machine is in operation and while the transporting vehicle is in motion. The nozzle can be repositioned in azimuth and elevation as separate functions or simultaneously in order to achieve a droplet launch at any angle within predetermined limits. Such predetermined limits are preferably about 180 degrees in azimuth included angle and about 75 degrees in elevation included angle. Preferably, the elevation included angle limits allow movement within the range from about 60 degrees above to about 15 degrees below a preset position and the azimuth limits are set to permit movement of about 90 degrees on either side of a centerline, with the centerline preferably being the nominal direction of travel of the conveying vehicle. Rapid repositioning of the spray angle is a feature of the invention with full travel in azimuth being accomplished within about 2 seconds and full travel in elevation being accomplished within about 4 seconds.

Azimuth and elevation movements are controlled by switches or other actuating devices located in a remote control box positioned adjacent the operator of the conveying vehicle. Limit sensors such as for example, limit switches, located on the generator act to stop the travel at the predetermined limits. Azimuth movement is accomplished by rotation of an upward boom about a generally vertical axis and elevation movement is accomplished by rotation of one or more nozzle arms about a movable horizontal axis. Upward boom and nozzle arm members provide nozzle mechanical support act as a conduit for communicating nozzle pressurized air. A metered fluid supply provides a controlled amount of fluid to the nozzle where the fluid is sheared into droplets in a conventional manner by releasing the energy of the pressurized air within the nozzle. The generator includes rotary joints which are equipped with double O-ring seals and lubrication fittings. A reversible gear motor functionally coupled with the upward boom enables azimuth positioning and a linear actuator functionally coupled between upward boom and nozzle arm members enables elevation positioning.

BRIEF DESCRIPTION OF THE DRAWINGS

FIG. 7B is a section view of the rotary member illustrated in;

FIG. 7A, taken along the plane indicated by line 7B—7B in FIG. 7A.

DETAILED DESCRIPTION OF THE PREFERRED EMBODIMENT OF THE INVENTION

Figure 1:
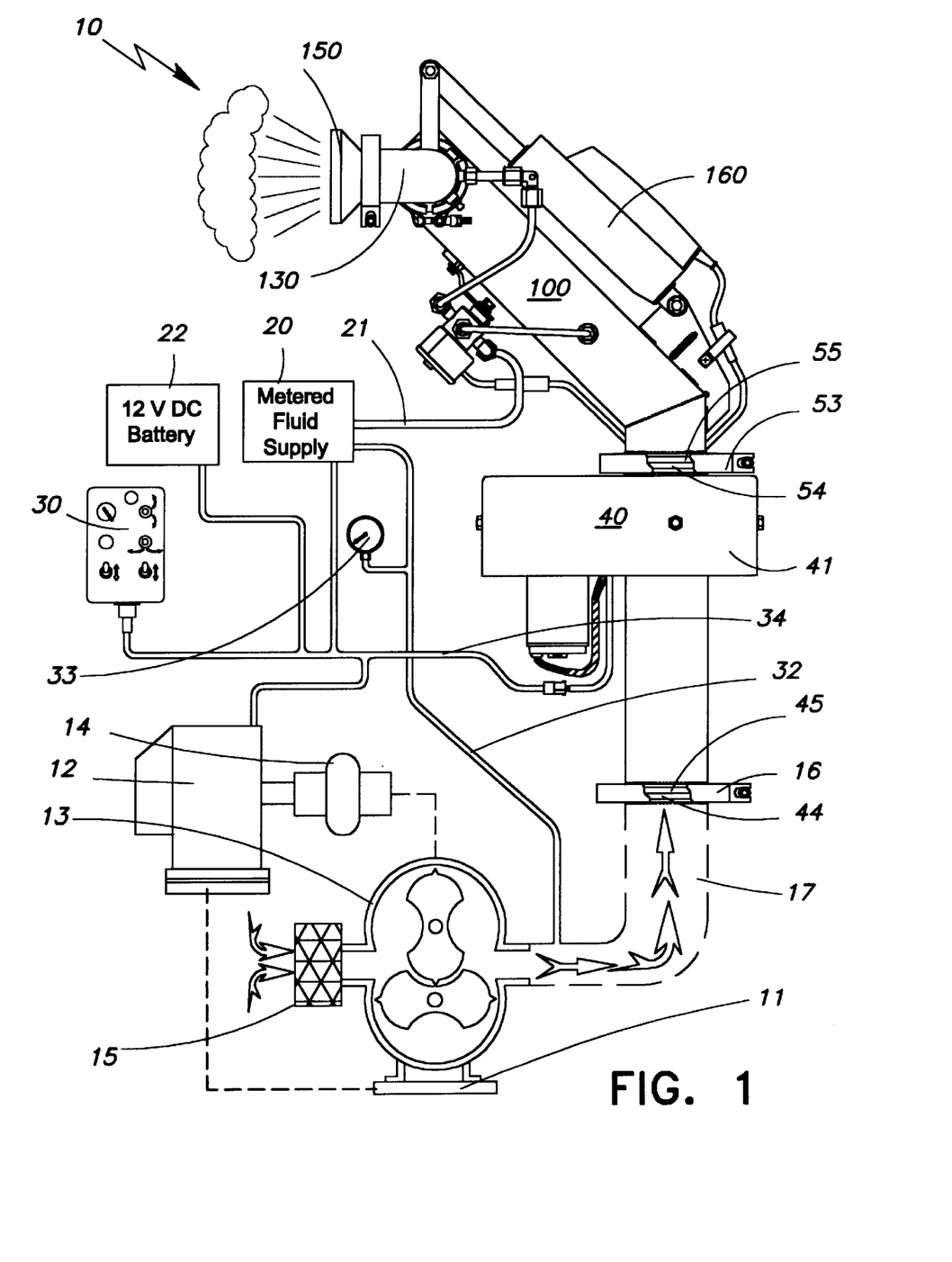
FIG. 1 is an illustration of the generator shown partially as a side elevation view and partially as a functional diagram.
Figure 2:
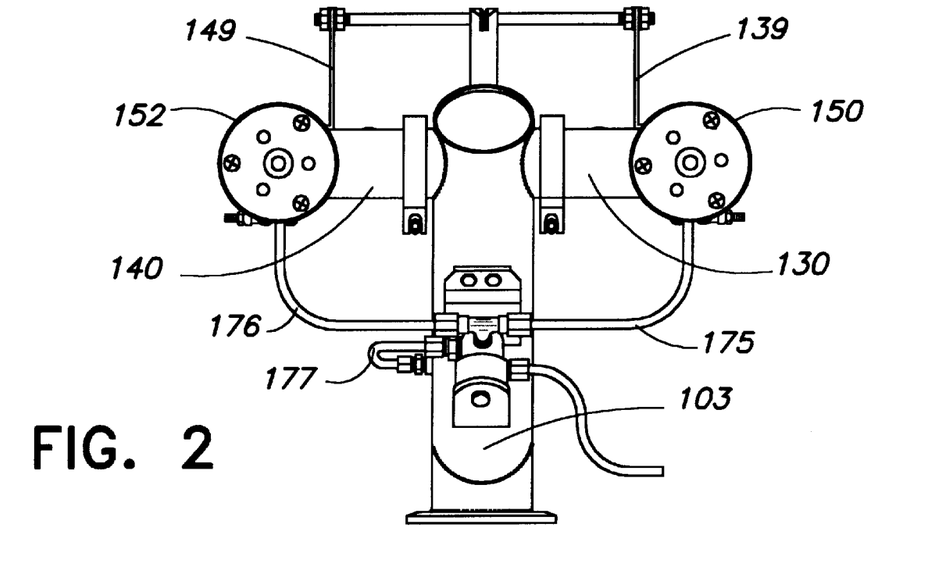
FIG. 2 is a front elevation view of an upward boom unit of the generator.
Figure 3:
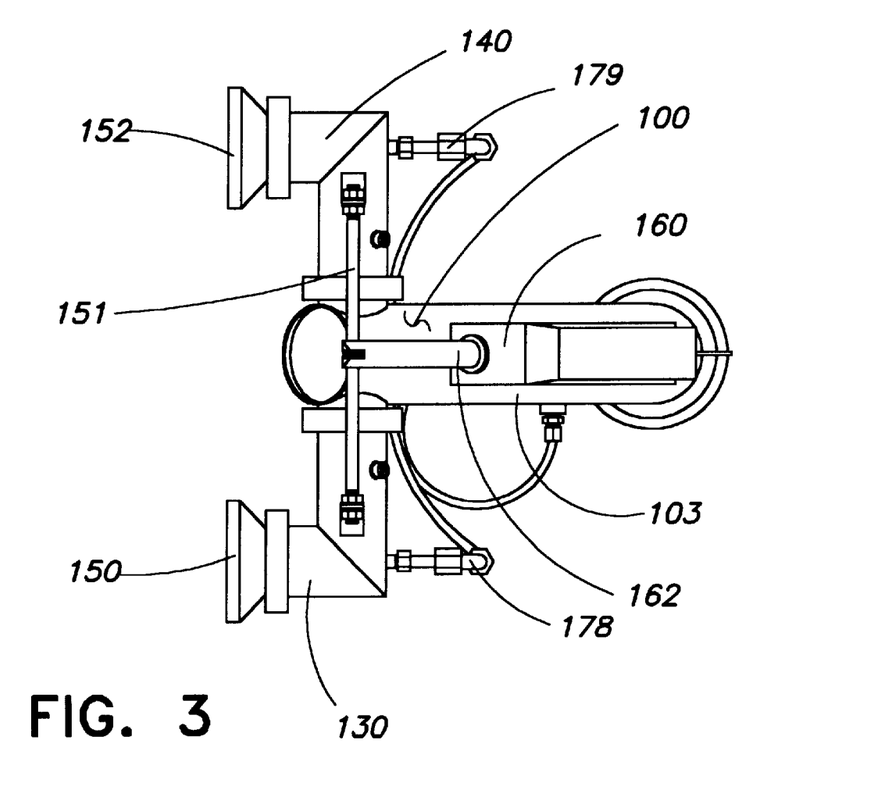
FIG. 3 is a plan view of the upward boom unit illustrated in FIG. 2.

Referring now to the various drawings and more particularly FIG. 1, the aerosol generator of the present invention is designated generally as 10. Generator 10 is adapted to be mounted on a truck or other vehicle by a base 11. Prime mover 12, such as for example a gasoline engine, drives air mover 13 by direct coupler 14. Air mover 13 receives air at atmospheric pressure through intake filter 15 and delivers air at elevated pressure through conduits in azimuth actuator 40 and upward boom 100. Referring now also to FIG. 2 and FIG. 3, air at elevated pressure continues through conduits in nozzle arms 130 and 140, exiting through nozzles 150 and 152. Air mover 13 is adapted with a suitable conduit 17 such as an elbow having circular flange 44 at its terminus end. Azimuth actuator 40 is tightly removably attached to conduit 17 by circular V-clamp 16 placed around mating circular flanges 44 and 45, circular flange 45 being a part of azimuth actuator 40 and circular flange 44 being a part of conduit 17. Air mover 13 is preferably a positive displacement rotary blower capable of an air output of 300 cubic feet per minute (cfm) at 10 pounds per square inch (psi) pressure. Prime mover 12 is preferably a 18 horsepower, twin cylinder, 4-cycle gasoline engine. The term circular flange refers to a ring shaped flange having an inner diameter, an outer diameter, one relatively flat face and one beveled face. Upward boom 100 is tightly removably attached to azimuth actuator 40 by circular V-clamp 53 placed around mating circular flanges 54 and 55, circular flange 54 being a part of azimuth actuator 40 and circular flange 55 being a part of upward boom 100. Referring now to FIG. 4 and FIG. 5, azimuth actuator 40 is illustrated with cover 41 cut away. During operation, actuator base 42 is rotationally stationary and actuator top 60 rotates with respect to actuator base 42. Circular flange 45 is continuously welded to the lower end of air duct 43. Bearing support flange 46 having an internal diameter of about the external diameter of air duct 43 is welded to the upper end of air duct 43. At least three and preferably four gussets 47 are welded to air duct 43 preferably at equally spaced intervals for support of motor mounting plate 48. Motor mounting plate 48 is welded to each gusset 47. Motor mounting plate 48 has a hole of sufficient diameter that azimuth actuator top 60 may freely pass through mounting plate 48. Mounting plate 48 has a plurality of holes for receiving gear motor 76. Bearing support flange 46 has a plurality of holes on a bolt circle for receiving bolts 183. Threaded boss 51 is welded to the external surface of air duct 43 and a passage is drilled through a wall of air duct 43 so that grease fitting 52 can communicate lubricant to the interior of air duct 43.

Referring now to FIG. 6, azimuth actuator top 60 is received by the internal diameters of air duct 43 and bearing support flange 46. Referring now to FIG. 7A and FIG. 7B, the lower end of thin walled tube 61 is continuously welded inside bearing flange 66. Tube 61 fits over the external diameter of insert 63 and tube 61 is continuously welded to the upper end of insert 63. The internal diameter of thrust flange 65 receives the external diameter of tube 61 with clearance for free rotation of thrust flange 65 about tube 61. Thrust flange 65 has a plurality of holes equally spaced on a bolt circle for receiving a plurality of bolts 183. Referring also to FIG. 6, bearing flange 66 has an external diameter which clears bolts 183 in thrust flange 65. Azimuth actuator sprocket 64 has 60 cogs and an internal diameter closely receiving the external diameter of tube 61. Sprocket 64 is aligned in a plane parallel with the bottom surface of bearing flange 66 and skip welded to tube 61, preferably at equally spaced intervals, thereby capturing thrust flange 65 between sprocket 64 and bearing flange 66. Circular flange 54 is continuously welded to the top of tube 61. Insert 63 is adapted on its external diameter with O-ring grooves 67 and 68. When azimuth actuator top 60 is received into azimuth actuator base 42, O-ring groove 67 is located above grease fitting 52 and O-ring groove 68 is located below grease fitting 52. O-ring grooves 67 and 68 are fitted with O-rings 71 and 72 respectively to retain grease and provide an air seal during rotation of top 60. Washer like High Density Polyethylene anti-friction pads 73 and 74 are located respectively above and below bearing flange 66 and aid in ease of rotation of azimuth actuator top 60 with respect to azimuth actuator base 42. Anti-friction pad 73 located between thrust flange 65 and bearing flange 66 must be stretched into an elliptical shape for installation over flange 66. Azimuth actuator top 60 is secured to azimuth actuator base 42 by passing a plurality of bolts 183 through bearing support flange 46 and thrust flange 65 and securing each bolt 183 with a plurality of washers 184 and a plurality of lock nuts 185 in such a manner that with the exception of thrust flange 65, azimuth actuator top 60 will freely turn with respect to azimuth actuator base 42.

Figure 4:
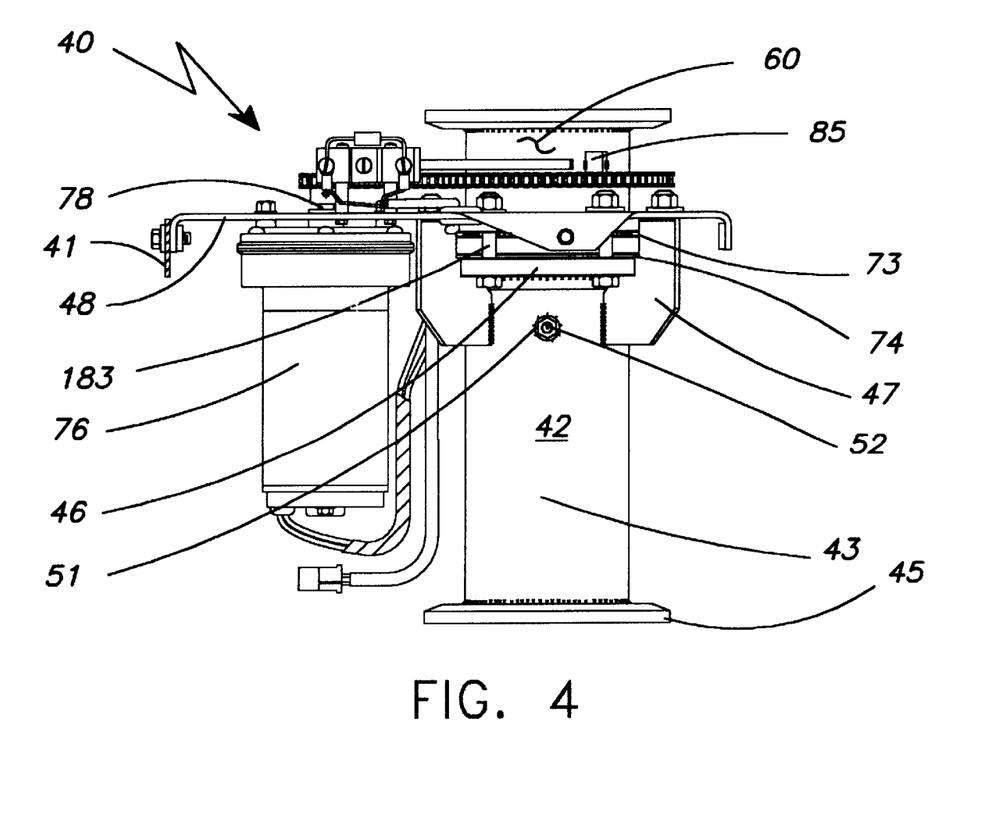
FIG. 4 is a side elevation view of the azimuth actuator unit of the generator with cover cut away.
Figure 5:
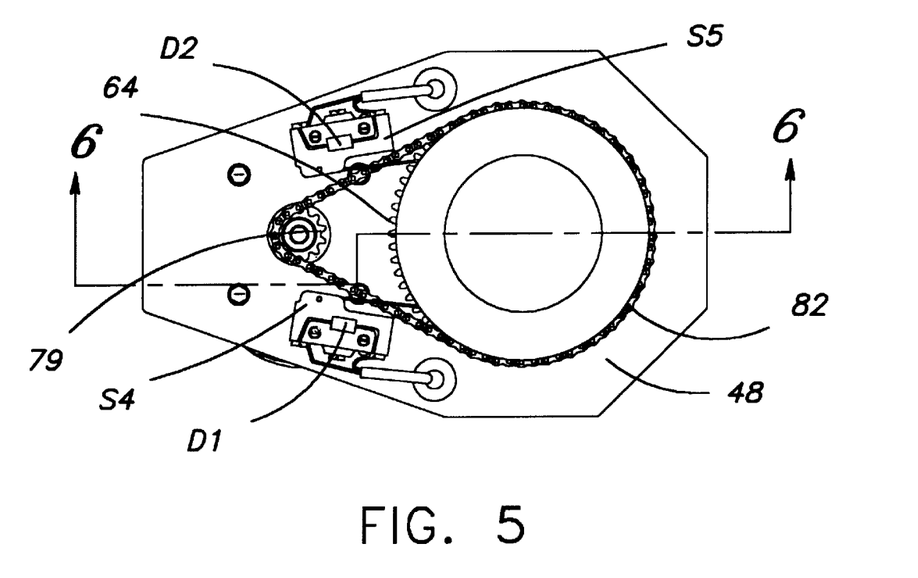
FIG. 5 is a plan view of the azimuth actuator unit illustrated in FIG. 4.
Figure 6:
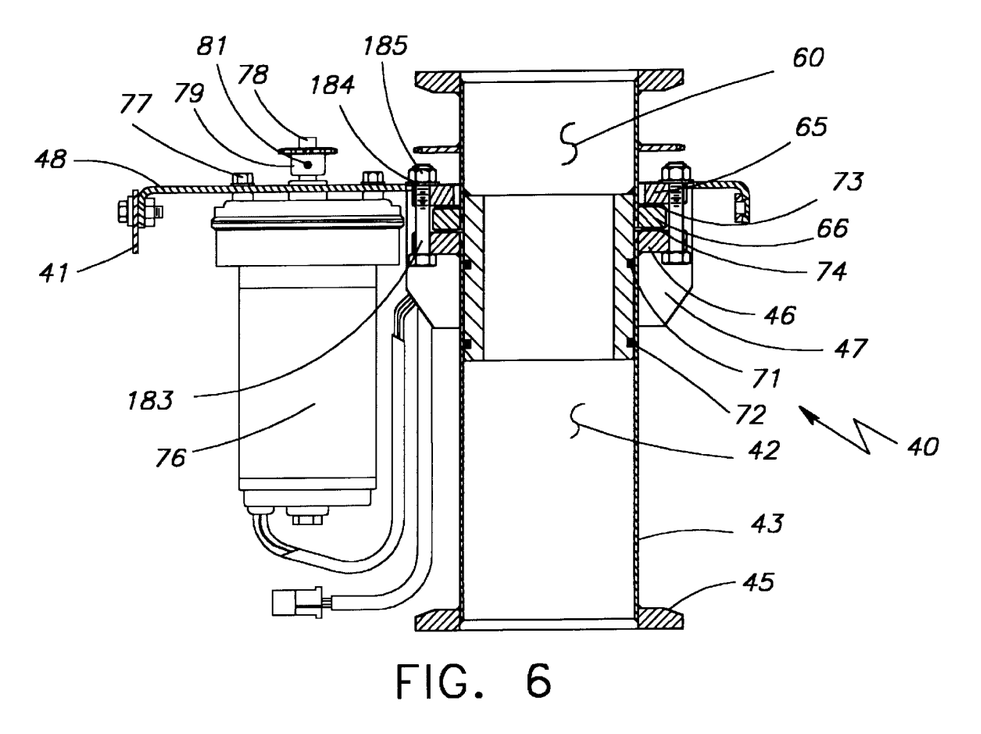
FIG. 6 is a partial cross section view of the azimuth actuator unit illustrated in FIG. 3, taken along the planes indicated by line 6—6 shown in FIG. 5.
Figure 7A:
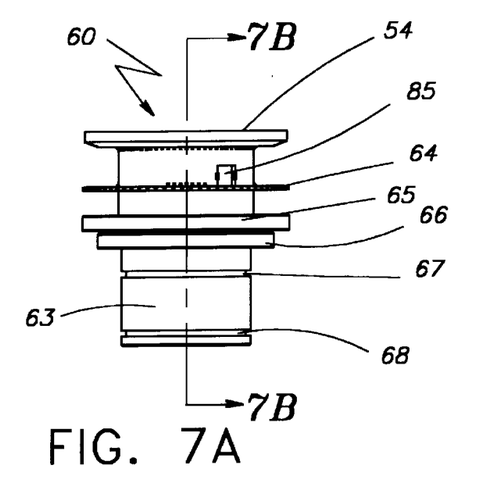
FIG. 7A is a side elevation view of a rotary member of the azimuth actuator unit illustrated in FIG. 4.
Figure 7B:
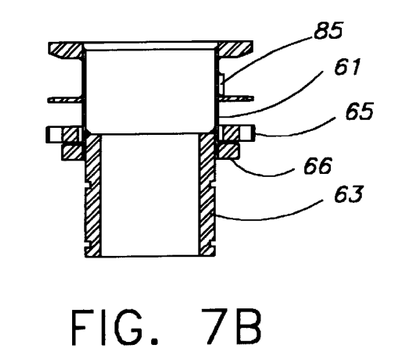

Referring now to FIG. 6, gear motor 76 is secured to mounting plate 48 with a plurality of screws 77. Mounting plate 48 is adapted to receive output shaft 78 of gear motor 76 so that output shaft 78 is substantially parallel with the rotational axis of azimuth actuator top 60. Output shaft 78 is adapted to receive motor sprocket 79. Sprocket 79 has 12 cogs and is retained on output shaft 78 by pin 81. Gear motor 76 is a 12 volt DC motor having a full speed geared down output of 62 revolutions per minute. Referring now to FIG. 4 and FIG. 5, azimuth actuator sprocket 64 is coupled with motor sprocket 79 via chain 82, chain 82 having a 0.25 inch pitch. Clockwise limit switch S4 and counter clockwise limit switch S5 are positioned for activation by cam 85 to interrupt power to gear motor 76 when predetermined rotation limits are reached. The preferable limits are 180 degrees rotation limit to limit. Diodes D1 and D2 are connected in parallel with the normally closed contacts of switches S4 and S5 respectively and provide for rotation in the opposite direction after one of the predetermined limits is reached.

Figure 8A:
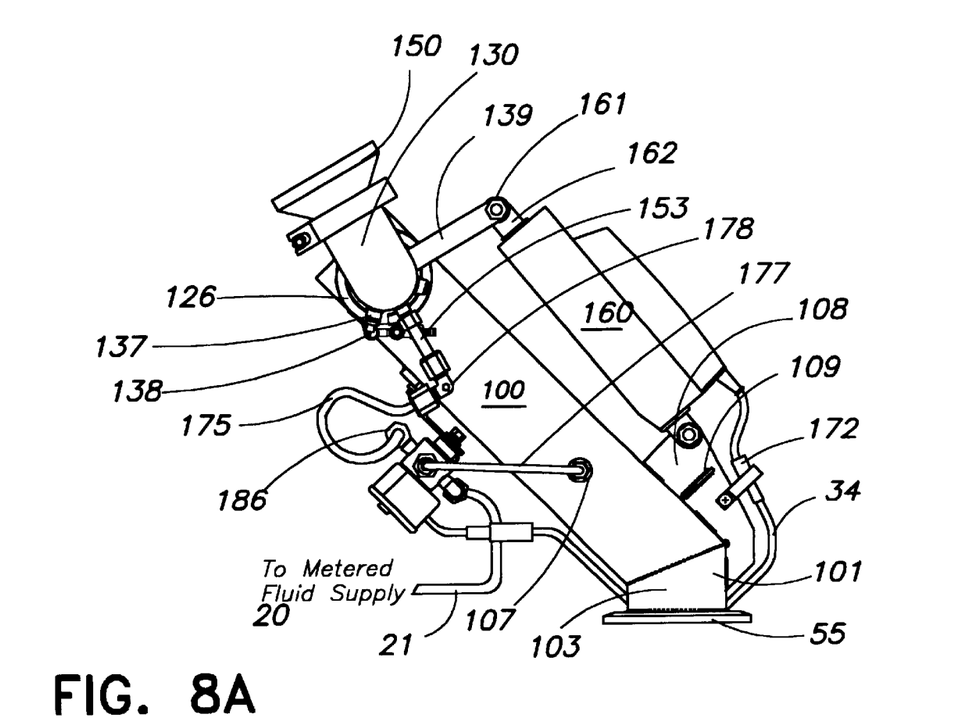
FIG. 8A is a side elevation view of the upward boom unit illustrated in FIG. 2.
Figure 8B:
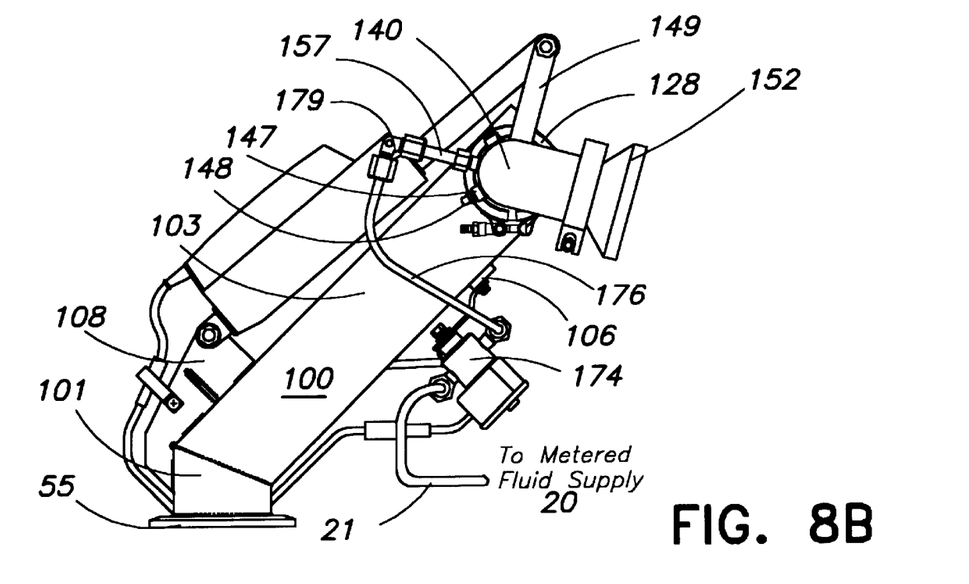
FIG. 8B is a side elevation view of the upward boom unit illustrated in FIG. 8A showing a side opposite the side shown in FIG. 8A.
Figure 9A:
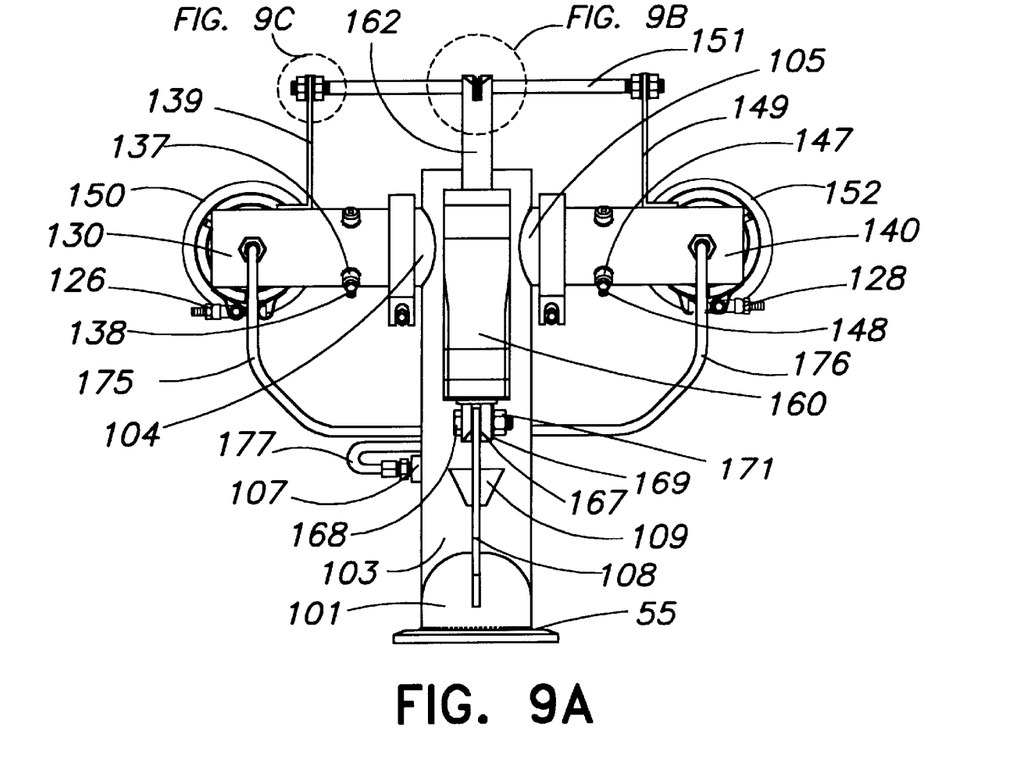
FIG. 9A is a back elevation view of the upward boom unit illustrated in FIG. 2.
Figure 10:
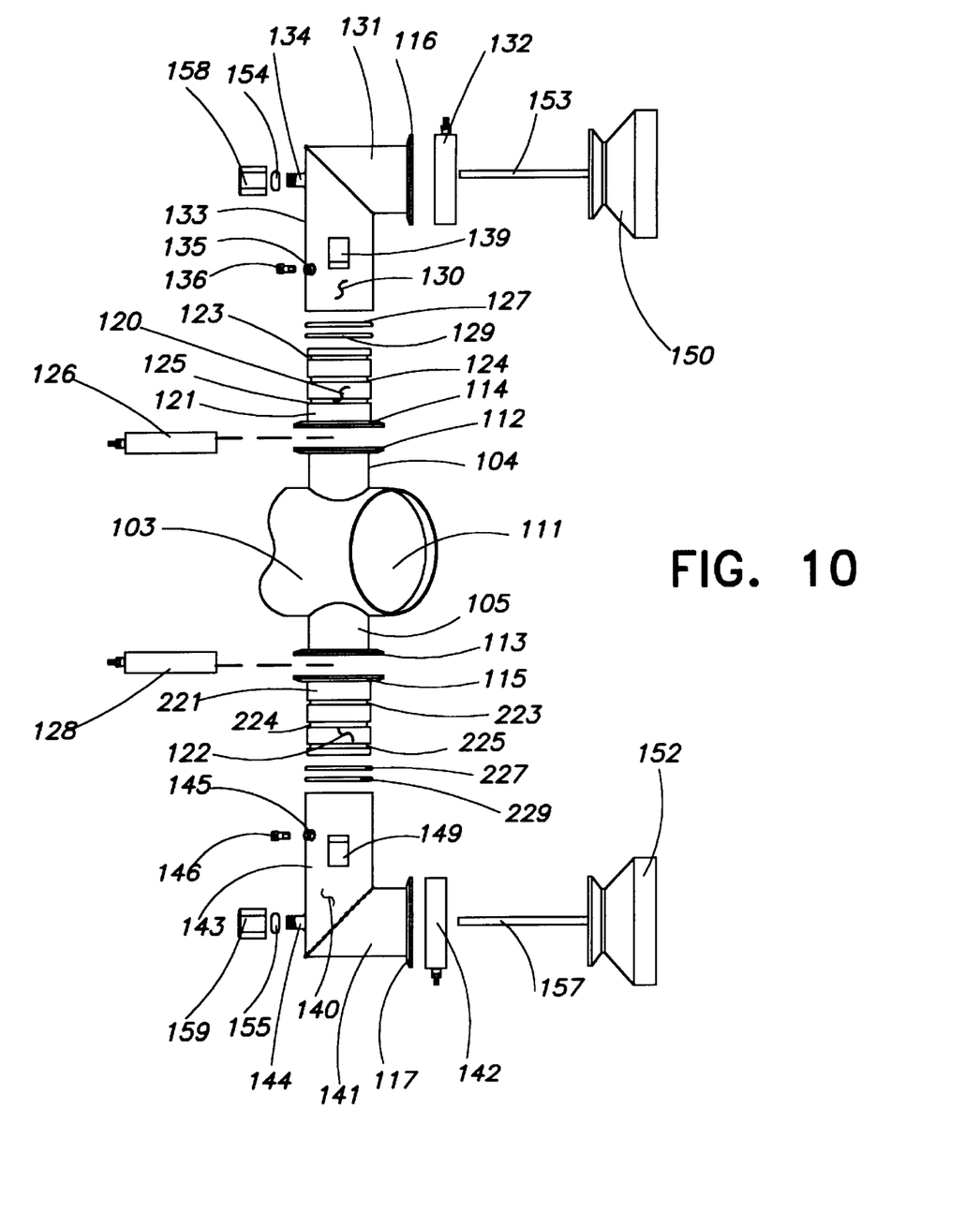
FIG. 10 is an exploded plan view of a portion of the upward boom illustrated in FIG. 3.

Referring now to FIG. 8A and FIG. 8B, transition air duct 101 is continuously welded to circular flange 55 at the lower end of transition air duct 101. The upper end of transition air duct 101 is cut at an angle for joining with the lower end of upward air duct 103 which is cut at the same angle. Transition air duct 101 and upward air duct 103 are continuously welded along the periphery of the ellipse formed by the angle cuts. Referring now to FIG. 9A and FIG. 10, left short air duct 104 and right short air duct 105 are continuously welded to upward air duct 103 near the terminus end of air duct 103. Air duct 103 is pierced to provide fluid communication with air ducts 104 and 105. Air ducts 104 and 105 are aligned with each other and transverse to upward air duct 103. Air ducts 104 and 105 are each terminated with circular flanges 112 and 113 respectively for receiving a nozzle arm adapters 120 and 122 respectively. Upward duct end cap 111 is continuously welded to the upper end of upward duct 103 to close the end of upward duct 103.

Nozzle arm adapters 120 and 122 are identical and interchangeable. Nozzle arm insert 121 is continuously welded to circular flange 114 along the inner diameter of flange 114. O-ring grooves 123 and 125 and retainer groove 124 are cut on the outer diameter of nozzle arm insert 121. O-ring grooves 123 and 125 receive O-rings 127 and 129 respectively. Nozzle arm adapter 120 is attached to outlet circular flange 112 using circular V-clamp 126. Nozzle arm insert 221 is continuously welded to circular flange 115 along the inner diameter of flange 115. O-ring grooves 223 and 225 and retainer groove 224 are cut on the outer diameter of nozzle arm insert 221. O-ring grooves 223 and 225 receive O-rings 227 and 229 respectively. Nozzle arm adapter 122 is attached to outlet circular flange 113 using circular V-clamp 128.

Nozzle arm 130 receives nozzle arm adapter 120. Discharge air duct 131 has a first end continuously welded to circular flange 116 and a second end cut at an angle and continuously welded to outward duct 133, which is also cut at an angle, along the periphery of the ellipse formed by the angle cuts. Preferably, the cuts are at a 45 degree angle creating a 90 degree angle when ducts 133 and 131 are joined. Nozzle feed through boss 134 is welded on the outer periphery of outward duct 133 on an axis perpendicular to the outward face of circular flange 116 and passing through the center of circular flange 116. Outward duct 133 is pierced to permit nozzle liquid tube 153 to pass through duct 133 and boss 134. Threaded retainer boss 135 is welded on the outer periphery of outward duct 133. Outward duct 133 is pierced to permit retainer screw 136 to pass through retainer boss 135 and protrude into the interior of duct 133. Retainer boss 135 is positioned to align with retainer groove 124 when nozzle arm 130 is assembled onto nozzle arm adapter 120. Nozzle arm 130 is retained on nozzle arm adapter 120 by retainer screw 136. Screw 136 protrudes into retainer groove 124 deep enough to prevent removal of nozzle arm 130 but not deep enough to prevent rotation of nozzle arm 130. Referring now to FIG. 9A, threaded grease fitting boss 137 is welded to the external surface of outward duct 133 and receives grease fitting 138. Outward duct 133 is pierced to permit fluid communication with the interior wall of duct 133 through grease fitting 138. Boss 137 is positioned so that when nozzle arm 130 is assembled onto nozzle arm adapter 120, grease fitting 138 permits injection of lubricant between O-ring grooves 123 and 125.

Referring again to FIG. 10, nozzle arm 140 is constructed as a mirror of nozzle arm 130 using like parts. Nozzle arm adapter 122 is received by nozzle arm 140. Discharge air duct 141 has a first end continuously welded to circular flange 117 and a second end cut at an angle and continuously welded to outward duct 143, which is also cut at an angle, along the periphery of the ellipse formed by the angle cuts. Preferably, the cuts are at a 45 degree angle creating a 90 degree angle when ducts 141 and 143 are joined. Nozzle feed through boss 144 is welded on the outer periphery of outward duct 143 on an axis perpendicular to the outward face of circular flange 117 and passing through the center of circular flange 117. Outward duct 143 is pierced to permit nozzle liquid tube 157 to pass through duct 143 and boss 144. Threaded retainer boss 145 is welded on the outer periphery of outward duct 143. Outward duct 143 is pierced to permit retainer screw 146 to pass through retainer boss 145 and protrude into the interior of duct 143. Retainer boss 145 is positioned to align with retainer groove 224 when nozzle arm 140 is assembled onto nozzle arm adapter 122. Nozzle arm 140 is retained on nozzle arm adapter 122 by retainer screw 146. Screw 146 protrudes into retainer groove 224 deep enough to prevent removal of nozzle arm 140 but not deep enough to prevent rotation of nozzle arm 140. Referring now to FIG. 9A, threaded grease fitting boss 147 is welded to the periphery of outward duct 143. Outward duct 143 is pierced to permit fluid communication with the interior wall of duct 143 through grease fitting 148. Boss 147 is positioned so that when nozzle arm 140 is assembled onto nozzle arm adapter 122, grease fitting 148 permits injection of lubricant between O-ring grooves 223 and 225.

Referring again to FIG. 9A, rotation levers 139 and 149 are welded to the top of outward ducts 133 and 143 respectively to aid in rotation of nozzle arms 130 and 140 during generator use. Rotation levers 139 and 149 receive tie rod 151 enabling left nozzle arm 130 and right nozzle arm 140 move in concert under the influence of linear actuator 160. Tie rod 151 is threaded at both ends and adapted with a retaining ring groove about midway between its ends.

Figure 9B:
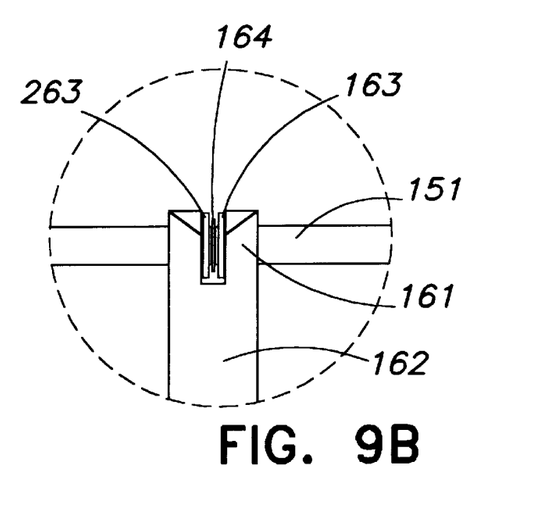
FIG. 9B is a detail view of a portion of FIG. 9A.
Figure 9C:
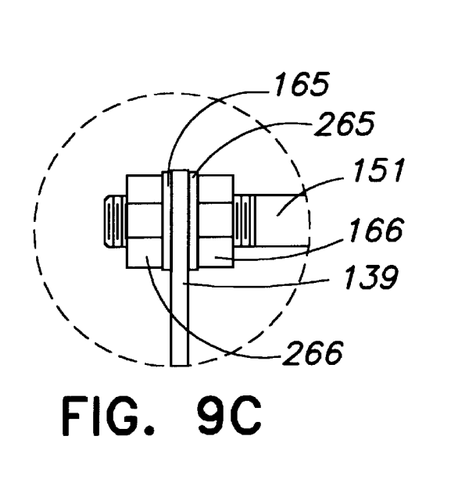
FIG. 9C is a detail view of another portion of FIG. 9A.

Referring now to FIG. 9A, FIG. 9B and FIG. 9C, linear actuator 160 is an electric motor driven screw type actuator having a clevis 161 at the terminus of connecting rod 162 and a second clevis 167 on the body of linear actuator 160. Clevis 161 receives tie rod 151 and is retained about midway of tie rod 151 by washers 163 and 263 and intervening retaining ring 164. Tie rod 151 is retained in rotation lever 139 by lock washers 165 and 265 and nuts 166 and 266. Tie rod 151 is retained in rotation lever 139 using identical hardware as for retention of lever 149. Clevis 167 of linear actuator 160 is secured to mounting bracket 108 using bolt 168, washer 169 and lock nut 171. Linear actuator 160 generates up to 60 pounds pull or thrust, operates from a 12 volt DC input and is reversible by reversing the polarity of the input voltage. A suitable linear actuator is manufactured by Linak USA Inc., Louisville, Ky. as model number LA 12.2-01-5.12.

Referring now to FIG. 8A, the electrical inputs to linear actuator 160 are adapted with connector 172 for convenient connection into wiring harness 34. Actuator mounting bracket 108 is welded to the exterior of upward duct 103 and laterally supported by a plurality of gussets 109 welded between air duct 103 and bracket 108. Preferably, one gussets 109 is welded on each side of bracket 108. Actuator mounting bracket 108 is also welded to the exterior of transition air duct 101 to provide reinforcement for the joint between air duct 101 and air duct 103. Valve mounting boss 106 and pressure tap boss 107 are welded to the exterior of upward duct 103. The wall of air duct 103 is pierced for fluid communication between pressure tap boss 107 and the interior of upward duct 103.

Referring again to FIG. 10, nozzles 150 and 152 are conventional two-fluid nozzles well known in the art of aerosol generators. Nozzles 150 and 152 utilize air at elevated pressure to atomize liquid supplied through nozzle tubes 153 and 157 into an aerosol droplet mist or cloud in the ultra low volume (ULV) range of 5–20 microns. Nozzle feed through bosses 134 and 144 receive nozzle tubes 153 and 157 respectively. The outer diameters of nozzle tubes 153 and 157 are sealed to feed through bosses 134 and 144 using elastomer seals 154 and 155 and tube nuts 158 and 159. Nozzles 150 and 152 are attached at circular flanges 116 and 117 respectively using circular V-clamps 132 and 142 respectively.

Referring now to FIG. 8A and FIG. 8B, nozzle tubes 153 and 157 are fluidly connected with the common port of spray-purge three way solenoid valve 174 through supply tubes 175 and 176, union elbows 178 and 179 and adapter tee 186. The normally closed port of valve 174 is fluidly connected with metered fluid supply 20 via fluid supply tube 21 and the normally open port of valve 174 is fluidly connected with pressure tap boss 107 via purge air supply tube 177. With electric power applied to three way valve 174, fluid is communicated from metered fluid supply 20 into nozzle tubes 153 and 157. With no power supplied to three way valve 174, air is communicated through nozzle tubes 153 and 157 quickly purging supply tubes 175 and 176 and nozzle tubes 153 and 157 of liquid thereby permitting aerosol generation to be rapidly terminated.

Referring now to FIG. 11, remote control 30 is intended to be positioned adjacent the operator of a vehicle transporting generator 10 during active use of generator 10. Remote control 30 is adapted with connector 31 for connection into wiring harness 34 (FIG. 1) for electrical communication with other parts of the generator. Wiring harness 34 necessarily includes a plurality of insulated electrical conductors and connectors for convenience in assembly. The necessary connections between remote control 30 and other parts of generator 10 are illustrated schematically in FIG. 12. The operation of remote control 30 will be explained along with the overall electrical and fluid systems functions which are illustrated in FIG. 12 and FIG. 13, respectively. System electrical power is obtained by connection to battery 22 which may be a part of generator 10 or may be a part of the transporting vehicle (not shown). Switch S6 is preferably a three position double pole key activated switch. In a first position, a ground signal is applied to stop engine 12. In a second position, switch S6 provides 12 V DC power for the azimuth and elevation positioning functions and for control of other generator functions. In a third position, 12 VDC power is supplied to engine 12 to activate the engine starter solenoid (not shown) for remote starting of the engine. Fuses Fl on remote control 30 and fuse F2 (not otherwise shown) located on the generator provide overload protection for generator wiring.

Remote control 30 further controls the repositioning of nozzle arms 140 and 150 in elevation via two pole, double throw, center off, switch S1. When S1 is placed in the "Up" position, 12 volt DC power of a first polarity is applied to linear actuator 160 causing connecting rod 162 to retract exerting force on tie rod 151 which in turn exerts force on rotation levers 139 and 149 rotating nozzle arms 130 and 140 toward the upward position illustrated in FIG. 14A. When S1 is placed in the "Down" position, 12 volt DC power of a second polarity is applied to linear actuator 160 causing connecting rod 162 to extend thus rotating nozzle arms 130 and 140 toward the downward position illustrated in FIG. 14B. Nozzle arms 130 and 140 may be stopped at intermediate positions within the limits by interrupting power with S1. Controls are included within linear actuator 160 to limit travel of connecting rod 162 at fully retracted and fully extended positions. The preferred elevation active rotational range of nozzles 140 and 150 is 60 degrees above horizontal and 15 degrees below horizontal and is determined by the effective length of levers 139 and 149 and the stroke of connecting rod 162. The limit controls of actuator 160 are configured so that after a limit is reached, the actuator will only accept power of a polarity that will drive connecting rod 162 away from the limit position and back into the active region. The rotation limits of arms 130 and 140 and subsequently nozzles 150 and 152 may be varied in an alternate configuration by altering the construction of levers 139 and 149. Shorter levers 139 and 149 will naturally result in a narrower rotation range and changing the angular relationship between levers 139 and 149 and the centerline of discharge ducts 131 and 141 will alter the center of rotation.

Remote control 30 further controls the repositioning of upward boom 100 and consequently nozzle arms 140 and 150 in azimuth via two pole, double throw, center off, switch S2. Referring now also to FIG. 4 and FIG. 5, when S2 is placed in the clockwise (CW) position, gear motor 76 of azimuth actuator 40 is energized transmitting power via sprocket 79, chain 82 and sprocket 64 rotating azimuth actuator top 60 and upward boom 100 in a CW direction toward the maximum CW position indicated in FIG. 14C. Rotation continues until power is interrupted either by Switch S2 or CW limit switch S4. Clockwise limit switch S4 is actuated by cam 85 when the limit is reached. In like manner, when S2 is placed in the counter clockwise (CCW) position, azimuth actuator top 60 and upward boom 100 rotate in a CCW direction toward the maximum CCW position indicated in FIG. 14D. Rotation again continues until power is interrupted either by switch S2 or CCW limit switch S5. CCW limit switch S5 is actuated by cam 85. The position of boom 100 may be stopped at intermediate positions within the limits by interrupting power with S2. Diodes D1 and D2 are connected in parallel with the normally closed contacts of switches S4 and S5 respectively and provide for rotation in the opposite direction after one of the predetermined limits is reached. Rotation from limit to limit is preferably about 180 degrees. The range between limits can be varied by repositioning limit switches S4 and S5 or by using an additional cam appropriately positioned. If desired, the center of rotation may be varied by loosening circular V-clamp 53 and rotationally repositioning boom 100 with respect to azimuth actuator top 60 and again tightening circular V-clamp 53. Alternately, the same result is achieved by loosening circular V-clamp 16 and rotationally repositioning azimuth actuator 40 with respect to conduit 17 and again tightening circular V-clamp 16.

Figure 11:
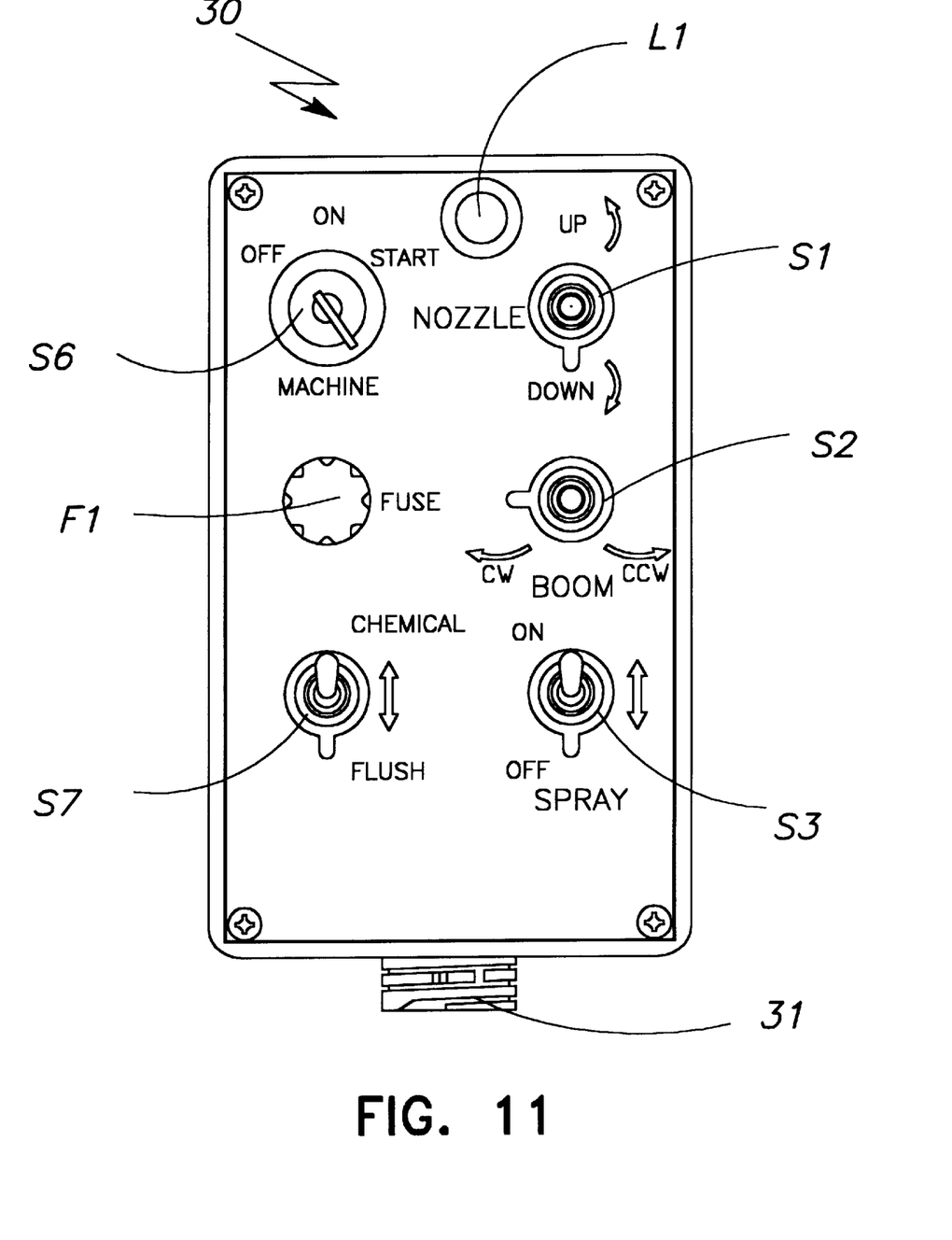
FIG. 11 is a plan view of the generator remote control box.
Figure 12:
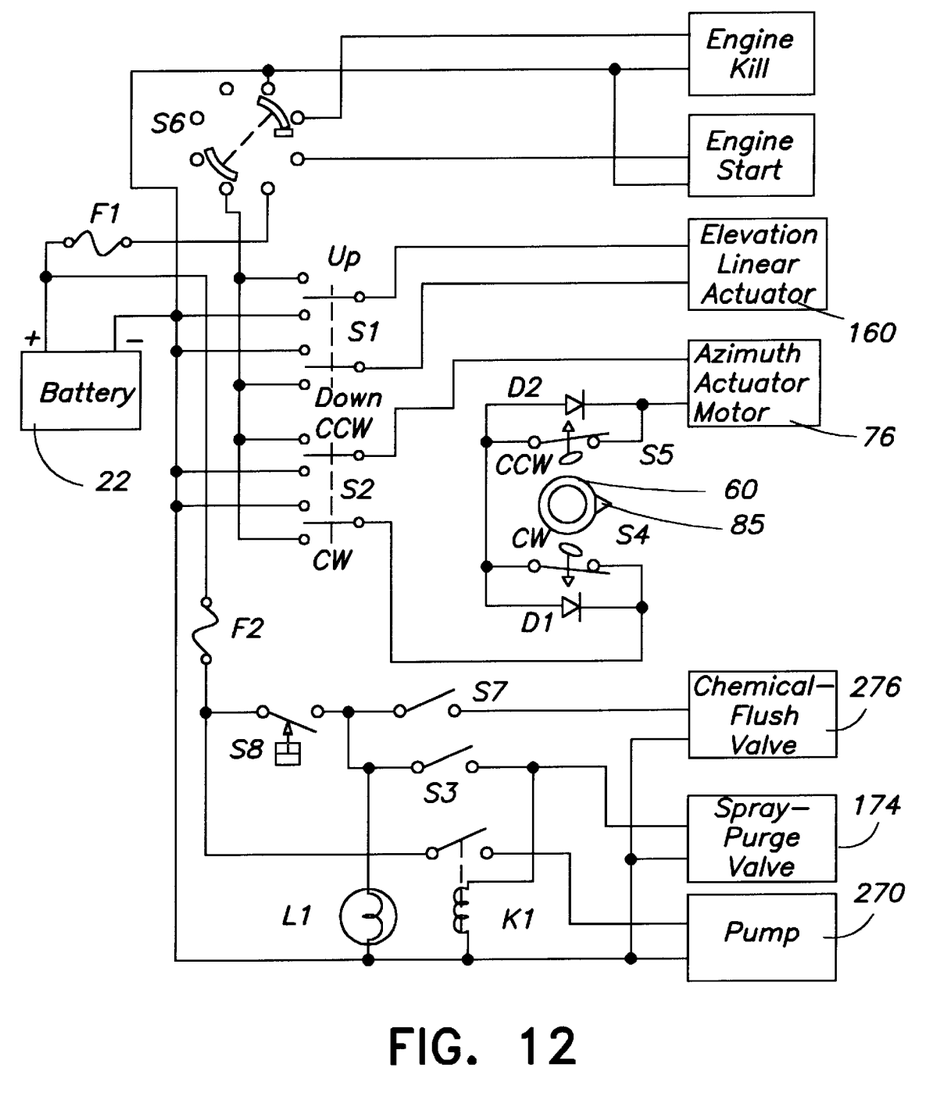
FIG. 12 is a schematic diagram of the electrical controls of the generator.
Figure 13:
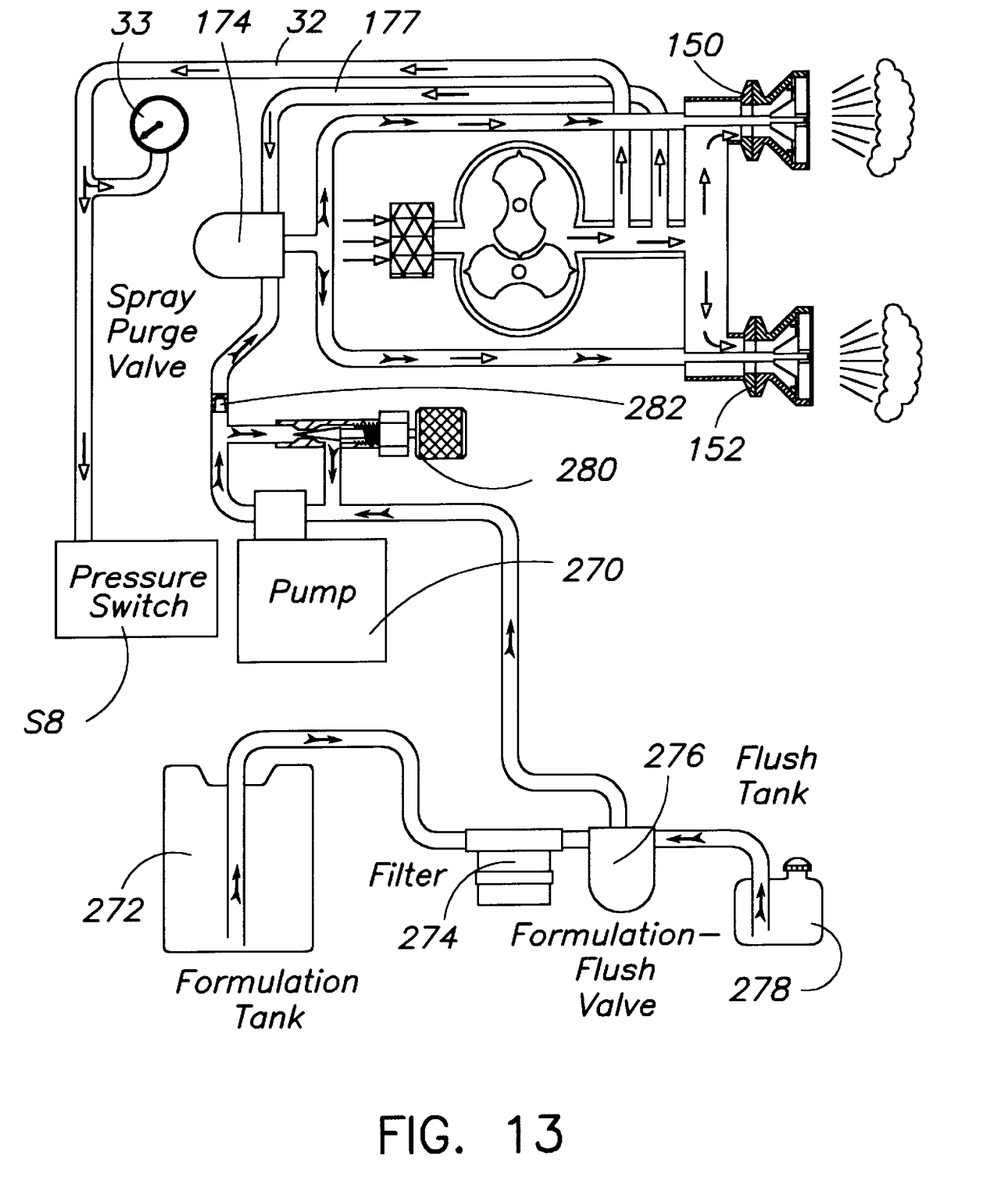
FIG. 13 is a fluid flow diagram for the generator.
Figure 14A:
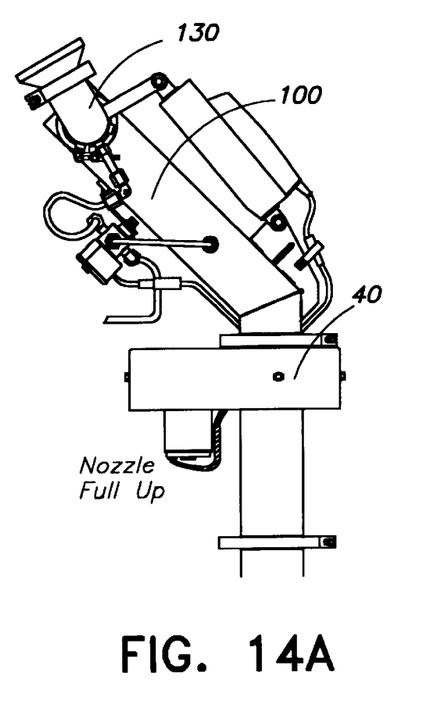
FIG. 14A is a diagram indicating the generator nozzles repositioned fully up.
Figure 14B:
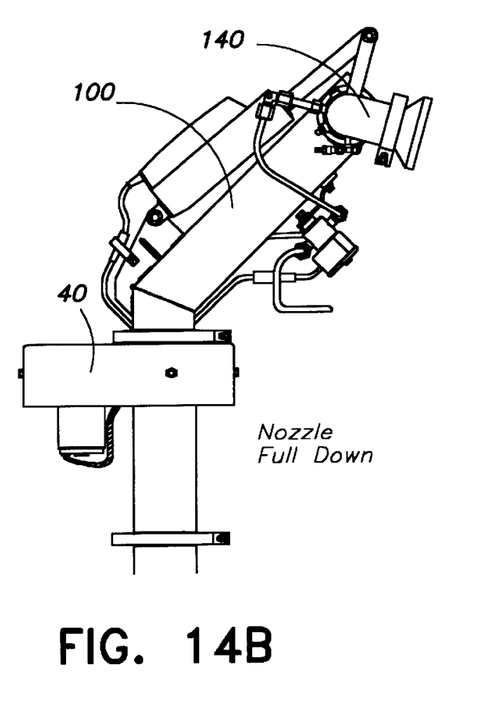
FIG. 14B is a diagram indicating the generator nozzles repositioned fully down.
Figure 14C:
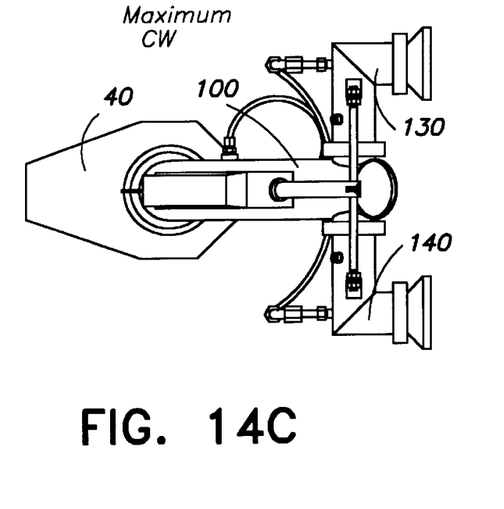
FIG. 14C is a diagram indicating the upward boom unit repositioned fully clockwise.
Figure 14D:
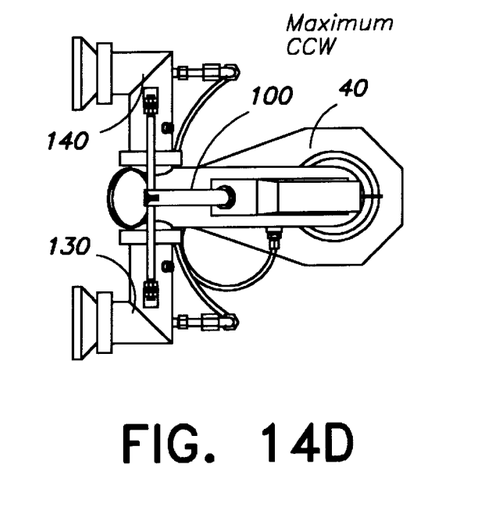
FIG. 14D is a diagram indicating the upward boom unit repositioned fully counter clockwise.
Figure 15A:
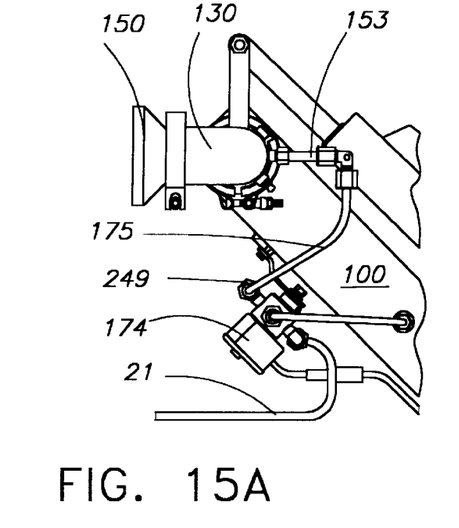
FIG. 15A is a partial side elevation view of an alternate embodiment of the upward boom unit of the generator.
Figure 15B:
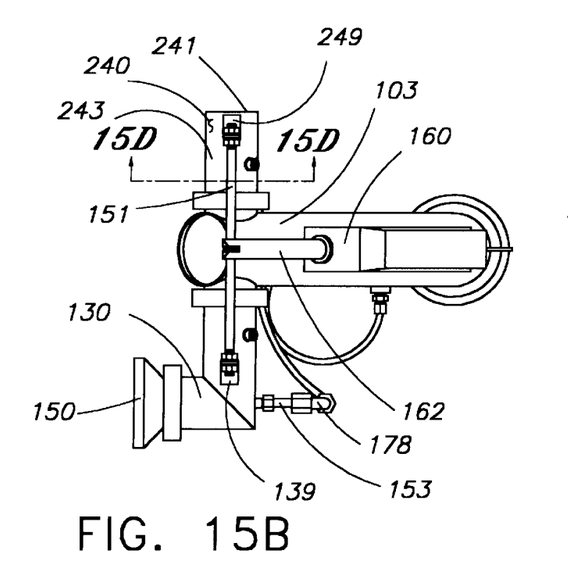
FIG. 15B is plan view of the alternate embodiment of the upward boom illustrated in FIG. 15A.
Figure 15C:
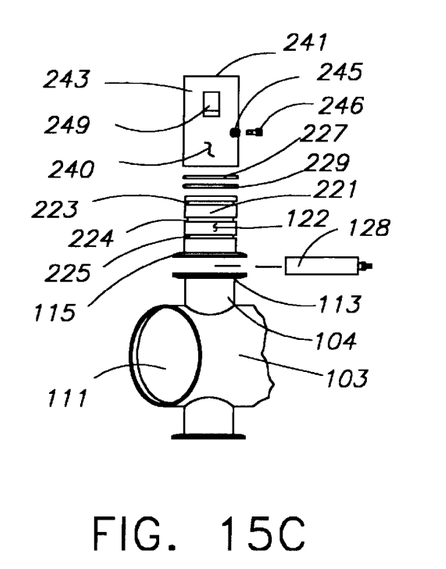
FIG. 15C is an exploded view of a portion of the alternate embodiment illustrated in of FIG. 15B.
Figure 15D:
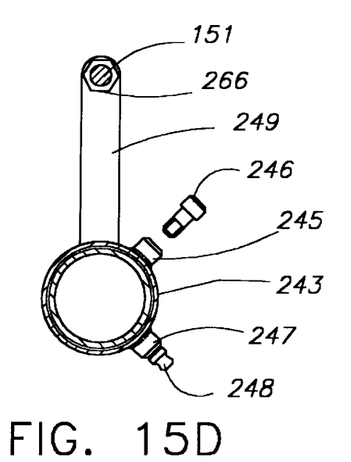
FIG. 15D is a partial section view of the alternate embodiment, taken along the plane indicated by line 15B—15B in FIG. 15B.

Referring now to FIG. 11, FIG. 12 and FIG. 13, remote control 30 further controls the supply of fluid from metered fluid supply 20 to nozzles 150 and 152. Metered fluid supplies are well know in the art of aerosol spraying and necessarily include tanks, filters, pumps, fluid tubes, pressure switches and control valves. Pressure switch S8 is in fluid communication with pressurized air from blower 13 via tube 32 (FIG. 1). When pressure is not sufficient to properly make an aerosol, such as for example when the generator runs out of gasoline, S8 interrupts control power to pump 270 and valve 174, preventing liquid flow to nozzles 150 and 152. Fluid flow to nozzles 150 and 152 is further controlled by switch S3. When switch S3 closes, power is applied to three way spray purge valve 174 and to relay K1 which in turn energizes pump 270. When S3 is closed, valve 174 communicates chemical formulation liquid through supply tubes 175 and 176 (FIG. 8A and FIG. 8B) and through liquid tubes 153 and 157 of nozzles 150 and 152 respectively where it is converted into aerosol form. When S3 is open, valve 174 communicates air under pressure through supply tubes 175 and 176 and through liquid tubes 153 and 157 of nozzles 150 and 152 respectively clearing these tubes of any remaining formulation. Switch S7 controls the source of liquid to be sprayed and selects liquid from either formulation tank 272 or flush tank 278 by controlling three way chemical-flush valve 276. Formulation tank 272 contains the active ingredient to be sprayed and flush tank 278 contains a solvent or other liquid for flushing residue of the chemical formulation from the system. Formulation tank 272 is in fluid communication with the normally closed port of valve 276 and flush tank 278 is in fluid communication with the normally open port of valve 276. When S7 is open, liquid flow from flush tank 278 through valve 276 into the inlet of pump 270 is enabled. When S7 is closed, liquid flow from formulation tank 272 through filter 274 and valve 276 into the inlet end of pump 270 is enabled. Switch S3 also energizes relay K1 which in turn provides power to Pump 270. Pump 270 is a 12 volt DC diaphragm pump having an unrestricted port capacity of about 3.8 liters per minute of a fluid having a viscosity of water. A suitable pump is manufactured by Flojet Corporation, Irvine California as Model 2100 series. The liquid flow to nozzles 150 and 152 is further controlled by bypass needle valve 280 and series metering orifice 282. Orifice 282 is preferably located inline as close as practical to the common port of spray-purge valve 174. Bypass needle valve 280 is a preferably a multiple-turn valve. When opened, valve 280 communicates fluid between the outlet of pump 270 and the inlet of pump 270 and is preferably located as near as practical to pump 270. Smaller effective diameter of orifice 282 or greater bypass flow through valve 280 reduce flow to nozzles 150 and 152 and greater effective diameter of orifice 282 or lesser flow through valve 280 increase flow to nozzles 150 and 152. With an effective orifice size of about 0.6 millimeter (mm) diameter and valve 280 fully closed, fluid flow to nozzles 150 and 152 is about 290 milliliters per minute (ml/min). With an effective orifice size of about 0.6 mm diameter and valve 280 fully open, fluid flow to nozzles 150 and 152 is about 175 ml/min. With orifice 282 removed, and valve 280 fully closed, fluid flow to nozzles 150 and 152 is about 3840 ml/min. With orifice 282 removed and valve 280 fully open, fluid flow to nozzles 150 and 152 is about 3480 ml/mi. The foregoing values are for a fluid with a viscosity of water. Naturally, other orifice sizes can be implemented to produce other ranges of flows. Pressure gage 33 provides means for monitoring the air pressure from air mover 13. Gage 33 is in fluid communication with the outlet of air mover 13 via conduit 17 and pressure sample tube 32 (FIG. 1). Gage 33 is useful as an aid in calibrating the machine for operation with a particular fluid. Indicator lamp L1 illuminates when pressure switch S8 is closed and provides a visual indicator to the operator that nozzle pressure is satisfactory for turning on the spray output.

An alternate embodiment of the present invention incorporates a single nozzle rather than two nozzles as in the preferred embodiment. The alternate embodiment is best illustrated by describing the changes to the preferred embodiment which are required to effect the alternate embodiment. Referring now to FIG. 8B and FIG. 10, one set of nozzle peculiar parts is removed, such as for example: nozzle 152, circular V-clamp 128, elastomer seal 155, tube nut 159; nozzle arm 140 which includes lever arm 149; screw 146; union elbow 179; and, supply tube 176. Referring now to FIG. 8A, FIG. 15A and FIG. 15B, fluid tee 186 is removed and replaced with elbow 251, reconnecting supply tube 175. Nozzle liquid tube 153 is now in fluid communication with the common port of valve 174 via elbow 251, supply tube 175, and union elbow 178. Referring now to FIG. 15C, nozzle arm adapter 122 is connected at circular flange 115 to circular flange 113 by circular V-clamp 128. O-rings 227 and 229 are again received by O-ring grooves 223 and 225 respectively. Nozzle arm adapter 122 is then received by balance arm 240 and balance arm 240 is secured by screw 246. Screw 246 protrudes into retainer groove 224 deep enough to prevent removal of balance arm 240 but not deep enough to prevent rotation of balance arm 240. In balance arm 240, rotation lever 249 is welded to blind duct 243. Blind duct cap 241 is continuously welded to the outward end of blind duct 243 to seal the outward end of blind duct 243. Tie rod 151 is connected with rotation lever 249 in the same manner as rotation lever 149 is connected with tie rod 151 in the preferred embodiment. Referring now to FIG. 15D, threaded retainer boss 245 is welded on the periphery of blind duct 243. Blind duct 243 is pierced to permit retainer screw 246 to pass through retainer boss 245 and protrude into the interior of duct 243. Retainer boss 245 is positioned to align with retainer groove 224 when balance arm 240 is assembled onto nozzle arm adapter 122. Threaded grease fitting boss 247 is welded to the external surface of duct 243. Duct 243 is pierced to permit fluid communication with the interior wall of duct 243 through grease fitting 248. Boss 247 is positioned so that when balance arm 240 is assembled onto nozzle arm adapter 122, grease fitting 248 permits injection of lubricant between O-ring grooves 223 and 225. Except for the number of nozzles, the alternate embodiment operates in other respects in the same manner as the preferred embodiment, however, depending on the flow rates and particle sizes desired, rudimentary changes in machine set up are required. For example, as different series orifice 282 (FIG. 13) may be required and changes in blower pressure may be required. The nature of these changes is readily determined by straight forward experimentation.

While the preferred embodiment and an alternate embodiment of the invention have been illustrated and described, it will be appreciated that variations can be made therein without departing from the spirit and scope of the invention.

We claim:

1. An aerosol generator, comprising:
   a two-fluid nozzle which generates and launches aerosol droplets;
   a fluid system which delivers a liquid to the nozzle;
   a blower which supplies air at elevated pressure;
   a conduit which supports the nozzle and communicates the air at elevated pressure from an inlet end of the conduit to the nozzle, the conduit comprising a rotary joint disposed between the inlet end of the conduit and the nozzle;
   an electric motor rotationally coupled with a movable member of the rotary joint, to reposition the nozzle according to a direction of rotation of the electric motor; and a remote control system which controls the direction of rotation of the electric motor.

2. An aerosol generator as claimed in claim 1 wherein the rotary joint is arranged to reposition the nozzle in azimuth.

3. An aerosol generator as claimed in claim 1 further comprising a drive chain which couples the electric motor to the rotary joint movable member.

4. An aerosol generator as claimed in claim 1 wherein the conduit further comprises a second rotary joint arranged to reposition the nozzle in elevation.

5. An aerosol generator as claimed in claim 4, further comprising an electrically operated linear actuator linked with a movable member of the second rotary joint.

6. An aerosol generator as claimed in claim 1 wherein the rotary joint is adapted to rotate the nozzle within predetermined limits up to 180 degrees azimuth included angle.

7. An aerosol generator as claimed in claim 5 wherein the linear actuator is remotely controlled to rotate the second rotary joint within predetermined limits up to 75 degrees elevation included angle.

8. An aerosol generator for dispensing droplets from a moving vehicle, comprising:
   a two-fluid nozzle which generates and launches droplets at an angle with respect to the vehicle;
   a blower which supplies air at elevated pressure:
   a fluid system which delivers a liquid to the nozzle;
   a conduit which receives the air at an inlet end and delivers the air at elevated pressure to the nozzle, the conduit further comprising first and second rotary joints interposed between the conduit inlet end and the nozzle;
   first and second actuators which actuate the first and second rotary joints, respectively, to reposition the launch angle of the droplets;
   an electrically operated remote control which controls the first and second actuators, the remote control operable by a driver of the vehicle.

9. An aerosol generator as claimed in claim 8, wherein the first actuator comprises:
   a first sprocket rotationally attached to the electric motor, a second sprocket rotationally attached to a movable member of the first rotary joint; and a drive chain which couples the first and second sprockets.

10. An aerosol generator as claimed in claim 8, wherein the first rotary joint repositions the azimuth launch angle of the droplets.

11. An aerosol generator as claimed in claim 8, wherein the second rotary joint repositions the elevation launch angle of the droplets.

12. An aerosol generator as claimed in claim 8, wherein the first rotary joint repositions the azimuth launch angle of said droplets and the second rotary joint repositions the elevation launch angle of said droplets.

13. An aerosol generator as claimed in claim 9 wherein further comprising first and second limit switches which limit a maximum azimuth rotation of the rotary joint.

14. An aerosol generator as claimed in claim 2 wherein the launch angle of the droplets is repositioned within predetermined limits of about 75 degrees elevation included angle.

15. An aerosol generator, comprising:
   a frame;
   a gasoline engine mounted on said frame;
   a positive displacement blower mounted on said frame and rotationally coupled with said engine;
   a plurality of two fluid nozzles each said nozzle having a first port and a second port;
   a conduit system which communicates air at elevated pressure from said blower to each said first port of said nozzles, said conduit system further supporting said nozzles, said conduit system further comprising a remotely controlled rotary joint which repositions a droplet launch angle of each said nozzle while said generator is in operation; and,
   a liquid supply system further comprising at least one liquid reservoir, a pumping system which withdraws liquid from said reservoir and delivers said liquid to each said second port of said nozzles.

16. An aerosol generator as claimed in claim 15 wherein said rotary joint positions the azimuth droplet launch angle of said nozzles.

17. An aerosol generator as claimed in claim 15 wherein said rotary joint positions the elevation droplet launch angle of said nozzles.

18. An aerosol generator comprising:
   a frame;
   a gasoline engine mounted on said frame;
   a positive displacement blower mounted on said frame and rotationally coupled with said engine;
   a two fluid nozzle having a first port and a second port;
   a conduit system which communicates air at elevated pressure from said blower to said first port of said nozzle, said conduit system further supporting said nozzle, said conduit system further comprising a plurality of remotely controlled rotary joints which reposition the azimuth and elevation droplet launch angles of said nozzle while said generator is in operation; and,
   a liquid supply system further comprising at least one liquid reservoir, a pumping system for withdrawing liquid from said reservoir and delivering said liquid to said second port of said nozzle.

* * * * *